United States Patent [19]

Chen et al.

[11] Patent Number: 5,709,219
[45] Date of Patent: Jan. 20, 1998

[54] METHOD AND APPARATUS TO CREATE A COMPLEX TACTILE SENSATION

[75] Inventors: Elaine Chen; Brian Eberman, both of Somerville; Beth A. Marcus, Lexington, all of Mass.

[73] Assignee: Microsoft Corporation, Redmond, Wash.

[21] Appl. No.: 682,951

[22] Filed: Aug. 1, 1996

Related U.S. Application Data

[63] Continuation of Ser. No. 187,646, Jan. 27, 1994, abandoned.

[51] Int. Cl.⁶ .................................................. A61B 5/103
[52] U.S. Cl. .................................................. 128/782
[58] Field of Search ................................ 128/739, 742, 128/744, 774, 782

[56] References Cited

U.S. PATENT DOCUMENTS

| | | | |
|---|---|---|---|
| 5,022,407 | 6/1991 | Horch et al. | 128/744 |
| 5,275,174 | 1/1994 | Cook | 128/774 |

FOREIGN PATENT DOCUMENTS

WO91/11775  8/1991  WIPO.

OTHER PUBLICATIONS

Ellis, R.E. et al., "Design and Evaluation of a High–Performance Prototype Planar Haptic Interface," Advances in Robotics, Mechatronics, and Haptic Interfaces, DSC—vol. 49, ASME 1993, pp. 55–64.

Iwata, Hiroo, "Pen–Based Haptic Virtual Environment," IEEE 1993, pp. 287–292.

Tan, Hong Z. et al., "Manual Resolution of Compliance When Work and Force Cues are Minimized," Advances in Robotics, Mechatronics, and Haptic Interfaces, DSC—vol. 49, ASME 1993, pp. 99–104.

Schmult, Brian et al., "Application Area for a Force–Feedback Joystick," Advances in Robotics, Mechatronics, and Haptic Interfaces, DSC—vol. 49, ASME 1993, pp. 47–54.

Kotoku, Tetsuo et al., "Environment Modeling for the Interactive Display (EMID) Used in Telerobotic Systems," IEEE Nov. 3–5 1991, pp. 999–1004.

Kotoku, Tetsuo, "A Predictive Display with Force Feedback and Its Application to Remote Manipulation System with Transmission Time Delay," IEEE Jul. 7–10 1992, pp. 239–246.

Itawa, Hiroo et al, "Volume Haptization", IEEE 1993, pp. 16–19.

Burdea, Grigore et al., "Distributed Virtual Force Feedback," IEEE May 2, 1993, Atlanta, GA, pp. 25–44.

Adelstein, Bernard D. et al., "Design and Implementation of a Force Reflecting Manipulandum for Manual Control Research," ASME Winter Annual Meeting, Nov. 1992, Aneheim, CA.

Adelstein Bernard D., "A High Performance Two Degree–of–Freedom Kinesthetic Interface," Massachusetts Institute of Technology, Cambridge, MA, pp.108–113. (No Date).

Caldwell, Darwin G. et al., "Enhance Tactile Feedback (Tele–Taction) using a Multi–Functional Sensory System," IEEE International Conference on Robotics and Automation, Sponsored by IEEE Robotics and Automation Society, May 2–6, 1993, Atlanta, Georgia, vol. 1: May 3, 1993, 7pp.

Hirota, Koichi et al., "Development of Surface Display," IEEE Virtual Reality Annual International Symposium Sep. 18–22, 1993, Seattle, Washington, Published Sep. 9, 1993, 8pp.

Primary Examiner—Max Hindenburg
Attorney, Agent, or Firm—Ronald M. Anderson

[57] ABSTRACT

A system for providing haptic information to a human operator. The system utilizes display devices that dynamically convey touch sensations to the human operator, thereby creating various tactile sensations such as texture and slippage. The system can combine multiple display devices as needed in order to create a specified sense.

10 Claims, 4 Drawing Sheets

METHOD AND APPARATUS TO CREATE A COMPLEX TACTILE SENSATION

This application is a file wrapper continuation application, based on prior application Ser. No. 08/187,646, filed Jan. 27, 1994, now abandoned the benefit of the filing date of which is hereby claimed under 35 U.S.C. §120.

This invention was made with Government support under Contract Number F41624-93-C-6008 awarded by the Department of Defense. The Government has certain rights in the invention.

The present invention relates generally to a system for providing haptic information to the human body. Haptic or tactual perception, commonly referred to as the "sense of touch", is actually composed of two parts: the cutaneous sense and kinesthesis [Loomis & Lederman, 1986]. The cutaneous sense mediates awareness of stimulation at the skin, while kinesthesis provides information on body parts. Conscious experience of mechanical cutaneous stimulation is known as "tactile perception".

BACKROUND

The sense of touch, of haptic sense, is complex. Unlike vision, touch involves a direct physical interaction, so that human actions cause and change what is perceived. It is the fundamental role of touch to sense the results of these contact interactions in order to guide manipulation and body motion. The current art only contains devices for presenting a crude tactile image to a location on the body. This type of information represents only a fraction of the total information sensed by the human sense of touch. Many different types of basic information about the contacts are extracted by people through a combination of four different tactile sensory systems, measurement of joint motion, and measurement of joint torques. This basic information can be organized broadly into passively acquired information and actively acquired information. Passively acquired information can be gathered without relative motion between the body and an object and without varying the forces between the body and the object. Actively acquired information requires either relative motion or varying contact forces. A summary of some of the basic types of cues or sensed information is given below.

Passively Acquired Identification Cues

Passively acquired identification cues can be obtained by the act of holding an object in the hand. The inventors herein have identified three major cues in this category.

1. Determining the Local Contact Normal and Curvature of the Surface at each Contact.

Determining the local contact curvature and labeling it as a point, edge, or planar contact is important for grasp acquisition and object identification. Different contact types have different grasp properties which affect stability [Salisbury, 1985]. In addition, the local contact normal and curvature provide a strong pruning heuristic rule for identifying objects and object pose [Grimson, 1990]. Local object curvature can be measured passively by examining the normal contact force distribution.

2. Determining the Surface Texture at each Contact.

Surface texture affects grasp stability. Rough textures are generally easier to grasp than smooth textures. In addition, surface texture can also be used as a pruning heuristic rule in identifying objects and object pose. Texture cues are produced both from the spatial distribution of the contact force and the dynamic vibration effects produced at the skin during motion.

3. Gross Object Shape.

By using the finger geometry and the location of the contact points in the hand, the shape of the object can be estimated. For example, an initial grasp might be a power grasp in order to get a lot of contact information about an object. Once the object and its shape is identified, a dexterous grasp might be used for manipulation.

Actively Acquired Identification Cues

With some local active exploration, properties relating the reaction forces to the applied force can also be determined:

1. Determining the Local Stiffness at each Contact.

The local surface stiffness can be estimated by applying varying normal forces and measuring the change in contact area. Softer surfaces will produce a larger contact area for a given applied force. This is not a significant cue for manipulation of control surfaces and tools since almost all of the objects involved are rigid.

2. Determining Local Frictional Properties.

The local friction along with the local contact type control the local grasp stability. Friction can be measured by applying varying tangential forces and then detecting the onset of slip (slip detection is a separate basic manipulation cue; see next Section). This task also requires the ability to measure tangential forces.

3. Overall Object Stiffness.

By integrating the contact force over an area with the joint torques, and correlating this with joint deflection, the overall object stiffness can be computed.

4. Detecting Slip.

Detecting the onset of slip between an object and the hand is essential for grasp maintenance. Slip detection is used to determine the necessary grasp forces at each contact during all stages of manipulation.

5. Determining Object Mass (Weight), Center of Mass, and Moments of Inertia.

By manipulating a grasped object and measuring the resulting joint torques and net contact forces at the hands for different configurations, the weight, center of mass and moments of inertia of the object can be computed. This information can be used for object identification and pose determination [Siegal, 1993], as well as for computing the necessary torques for throwing or manipulating the object.

6. Estimating Directions of Contact Constraint.

Assembly is the process or bringing a moving part into a constrained relationship with a fixed part. In order to control the assembly process, the directions in which movement is constrained need to be estimated. Contact constraints are estimated using measurements of the reaction forces as a function of position and by measuring the direction of impact forces.

7. Detecting Changes in Contact Constraints.

This is one of the most common tasks during manipulation. The detents in switches, the termination in screws, the impacts from mating two parts are all examples. The onset of the change can be detected by looking for unexplained impact forces and the direction of the impact force.

Review of Haptic Devices

Position and Orientation Devices

Devices and systems are well known for measuring or monitoring one or more characteristics of an anatomical part (see for example U.S. Pat. Nos. 4,986,280, 3,258,007 and 3,364,929). A human controlled position sensing device for use in the field of robotics is also well known (see for example, U.S. Pat. Nos. 4,328,621, 4,534,694, 4,608,525, and 4,674,048).

Force Devices

Systems are also well known for providing force feedback to human operators. Force-reflective devices exist in a variety of forms, from joysticks to arm and hand controllers. These devices serve as input devices and haptic interfaces for virtual environment manipulation, or teleoperation.

While joysticks are probably the oldest of the haptic interface technologies and were originally conceived to control aircraft, many joysticks currently developed are being used for the control of remote manipulators. AT&T Bell Laboratories has developed a high performance, compact force-feedback joystick It was intended to support engineering, business, and scientific desktop computing applications. It is 7×4.5×3 inches in size, weighs approx. 2 lbs, can apply 75 grams force to the end of the joystick (2 inches long), and can run at over 200 Hz. its use has been demonstrated for navigating through an electronics CAD database by setting the force to have a step jump at the edge of each trace. It is fast enough to allow the users to feel textures, and provides enough force to give a good range of levels for different conditions.

A significant amount of research has been conducted on robot hands (Salisbury, 1985) and force-reflecting controllers (e.g. Bejezy and Salisbury, 1983, Agronin, 1987) for robot arm manipulation. These controllers can be anthropomorphic but are often tailored to the slave robots and imitate their kinematics. The advantage of controllers that imitate the kinematics of the human hands and arms is that they have the largest user range of motion. However, it is difficult to achieve high quality force feedback with these controllers and minimizing actuator size becomes a major design requirement. The Stanford/JPL 6 DOF hand controller is an example of a compact non-anthropomorphic force reflecting arm master. Sargent Industries/CRL manufactures a variety of master-slave manipulators for use in hazardous environments. Though their systems do provide force feedback, they are large, non-anthropomorphic, and are not meant to be portable. Similarly, Schilling Development, Inc. produces the TITAN 7F, and the GAMMA 7F, both of which are 6-4 Titanium constructed servo, hydraulic master/slave systems. The GAMMA 7F allows operation in radioactive environments. However, the force-feedback versions are still under development, and the master controllers are only semi-anthropomorphic.

One complete anthropomorphic system (Jacobsen 1989) uses high performance hydraulic actuators to provide force-reflection for 7 DOF up to and including the wrist, with more DOF's in the gripper (Sarcos, 1991). The device has a large range of force exertion at a relatively high bandwidth. However, it is bulky and also very expensive. Two other anthropomorphic teleoperation systems include the Force-Reflecting Hand Controller (FRHC) (McAffee et al.), and the Odetics exoskeleton (Burke, 1991). Both use steel cables to reflect forces and moments and remotely locate the motors. The FRHC provides motion in 6 DOF while the Odetics exoskeleton uses 7 DOF to represent the human arm. However, these systems are still not portable force-feedback devices. Iwata (Iwata 1990) describes a system for the thumb, two fingers and the palm. The palm is actuated by a six degree-of-freedom parallel stage driven by electric motors. Each of the two fingers and thumb has single DOF motion and is also driven by electric motors. This system can transmit large forces to the hand and fingers, but is limited to pinch type grasps because of the single DOF plates for the fingers.

Burdea, Zhuang, and Roskos (1991) describe a system based on pneumatic cylinders and the VPL dataglove. This system generates forces using pneumatic cylinders placed between the inside of the palm and the fingertips. The system is compact and lightweight, but at present can only simulate grasp forces between the palm and the fingertips. Contact of the fingers with objects supported externally cannot be simulated. While many forms of force-feedback devices have been developed, not many complete anthropomorphic systems exist. Of the anthropomorphic arm systems, the main disadvantage is their bulkiness and non-portability.

Tactile Devices

Tactile devices are also well known and fall into five basic categories. Tactile displays have been the subject of much research activity in the past thirty years. While neuroscientists studied the physiological roots of human tactile perception, engineers were interested in tactile display devices that substituted or augmented other senses such as sight and hearing. Tactile displays also demonstrated their usefulness in VR simulations and telerobotic operations by EXOS TouchMaster which utilized buzzers to display contact information of objects. To design a high performance force reflective exoskeleton master, tactile displays might provide the teleoperator with additional information such as contact locations that cold not be adequately displayed by force alone. Or tactile displays might simplify the requirement on force reflection. It was conceivable that a combination of tactile display and force reflection would be haptically more effective, technically less challenging and economically more feasible than force reflection alone.

The following paragraphs present an overview of tactile display technologies and their applications developed in the past thirty years.

Air or Water Jet Displays

Not all tactile displays make mechanical contact with the skin. Air or water jet displays are attractive because they eliminate the need for moving mechanical parts and because they exhibit a consistent frequency response. Air jet arrays were extensively tested by Bliss et al (1966, 1966a) in different configurations with applications in vision substitution (Bliss, et al, 1966, Roger, 1970) and as a user interface in tracking experiments (Hill, 1970). Steerable air and water jets were also investigated as a "substitute cathode ray tube", tracing cursive letters or figures or re-creating a visual image in a raster scanned format on the skin [Bliss, 1966, Collins and Madey, 1974].

Air or Water Bladder Displays

Air or water bladder displays are used to apply a continuous pressure on an area of skin. An example is the TELETACT device (Air Muscle Ltd), which consists of an elastic lycra glove lined with approximately twenty air pockets fed by microcapillary tubes [Stone, 1991]. This glove may be worn inside measurement devices such as the Mattel Power Glove or the EXOS Dextrous HandMaster (DHM) when interacting with a virtual environment. Air pockets generally suffer from extremely low bandwidth (order of 1 Hz) because of the elasticity of the bladder material.

Mechanical Tactor Elements or Arrays that Impact or Indent the Skin

This group of displays include most of the vibrotactile devices described in the literature in addition to a few displays operated at a very low frequency that would not normally be considered vibrotactile (such as the tactile interface for IBM graphics described by [Frisken-Gibson et al. 1987]).

While there are a few single-element display devices (see [Goldstein and Proctor, 1985, Terry and Hsiao, 1988]), the vast majority of mechanical tactile displays involve tactor arrays. The number of elements in these arrays run from two (such as the stump-mounted upper-limb prosthesis elbow angle display developed by [Mann and Reimers, 1970]) to 400 (such as the 20 ×20 back mounted array of solenoid activated tactors used by [White, 1970] and [Collins, 1970]).

Almost all of the devices in this group involve indenting or impacting the skin perpendicular to the skin surface. Two methods of actuation dominate these displays: solenoid activated pins and cantilevered piezoelectric bimorph reeds with a pin mounted to the tip. The OPTACON is an extremely well known piezoelectric bimorph activated vibrator array developed by Bliss et al (1970). It is a small 1.1×2.7 cm display with a matrix of 6×≧tactors, and can be operated from 12.5 Hz to 250 Hz. It was originally designed to serve as a reading aid for the blind in conjunction with an optic probe which digitizes the information in printed text, but due to its versatile design it was used extensively as a research tool by a variety of researchers (such as [Wicker et al, 1991]). The OPTACON is now commercially available from TeleSensory Systems. Another method of actuation that has great potential is the use of shape memory alloys (SMA). As a current is passed through the alloy, it changes shape and deflects a spring that holds a tactor pin in place [Johnson, 1990, McCarty, 1990]. TACTOOLS is a commercial tactile feedback product available from Ztensory Inc. for use in teleoperation and virtual reality (VR) applications. The same product is also available from Mondo Tronics.

Voice Coil Displays

These displays generate vibratory sensations by mounting a voice coil against the skin. Examples are found in [Patrick et al, 1990] and [Patterson and Katz, 1992]. The TouchMaster is a voice-coil based tactile feedback device manufactured by EXOS.

ELECTROTACTILE DISPLAYS

Electrotactile displays elicit touch sensations by indiscriminately stimulating all the touch and pain sensors in the skin with a current passing through the skin. These devices usually involve a remote stimulator (which supplies the power and generates the stimulation waveform) and a number of electrodes mounted on the skin using a sticky dielectric. Each electrode pair constitutes a stimulation site. While some systems involve single or a small number of isolated electrode pairs (such as the functional electrical stimulation feedback system developed by [Rutherford et al, 1987]), arrays of electrodes were also popular, with number of elements running up to 1024 in one instance [Collins and Madey, 1974].

Large arrays with electrotactile displays are achieved by using small, closely spaced concentric electrode pairs in a grid [Collins and Madey, 1974]. When the stimulation sites are few and sparsely distributed, a large common anode could be placed at a distance from the stimulation cites. The TICKLETALKER [Alcantara et al, 1993] is one such device, in which 8 cathodes are mounted on four metal rings worn on each of the four fingers, and a large anode is mounted on the wrist.

Current tactile feedback devices present a flat contact image using either arrays of tactors or raster scan techniques. This type of display can only be used for very local shape display or textures, and is limited to a flat type of display. Current force display devices can improve this situation when used in combination with tactile feedback, however the force displays have often geometrically limited the applicability of tactile displays. The concept of multimode feedback, that is the combination of one or more haptic modes in a single system, was developed specifically to overcome the limitations of the prior art.

SUMMARY OF THE INVENTION

It is therefore a general object of the current invention to provide a set of technologies and a method of providing touch or haptic information.

It is a more specific object of the current invention to provide a set of technologies and a method which can be used to present critical information either separately or in combination.

Another specific object of the current invention to provide a set of technologies and a method which can be used to present haptic cues either separately or in combination.

And another specific object of the current invention is to provide a strategy for coordinating multiple feedback modes such as force and tactile.

Yet another specific object of the present invention is to provide a haptic display which provides a continuous range of forces to the skin.

Yet another specific object of the present invention is to provide a haptic display which provides a time varying texture through relative tangential motion between the device and finger.

These and other objects of the present invention are achieved by a system for displaying multimode feedback to an operator. The system comprises:

A device for displaying tactile information to a body part;

Means for tracking the position and orientation of the body part;

Means for applying forces to the body part;

Means for implementing a multidimensional control strategy; and

Sensors for sensing body forces.

Other objectives of the invention will in part be obvious and will in part appear hereinafter. The invention accordingly comprises an apparatus possessing the construction, combination of elements, and arrangements of parts which are exemplified in the following disclosure, and the scope of the application of which will be indicated in the claims.

BRIEF DESCRIPTION OF THE DRAWING

The same numeral are used throughout the drawings to designate the same or similar parts.

DESCRIPTION OF THE PREFERRED EMBODIMENT

Figures 1A, 1B:
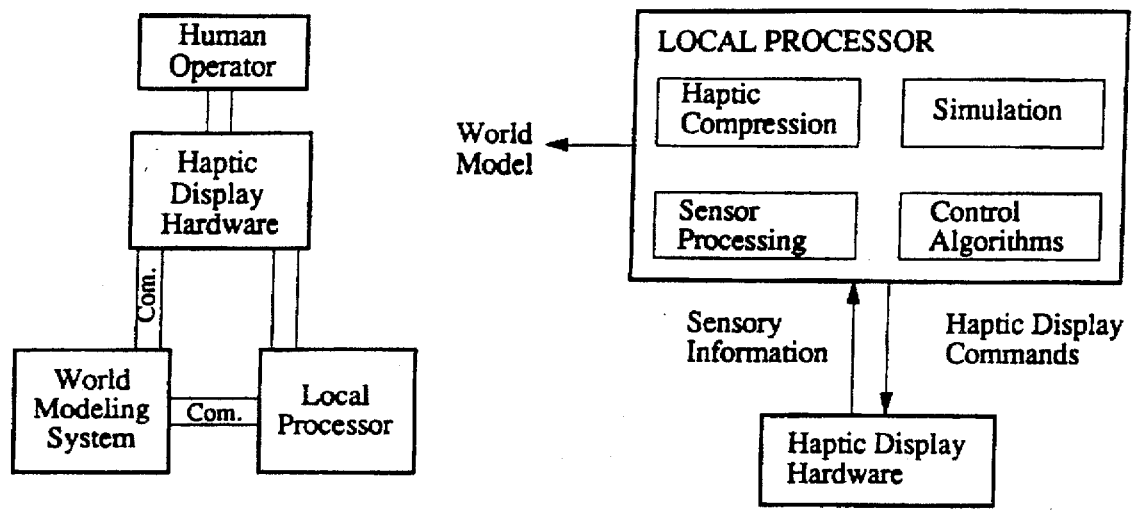
FIG. 1a and FIG. 1b are block diagrams of the preferred computerized system for obtaining and storing sensory information, controlling the displays, and communicating with other computers involved in the application.

The present invention generally relates to a system and method for providing touch feedback to the human operator and is adapted to have at least two applications. The system is useful in the control of computer generated or virtual environments and of real or robotic environments. [See FIGS. 1a and 1b]

Figure 2:
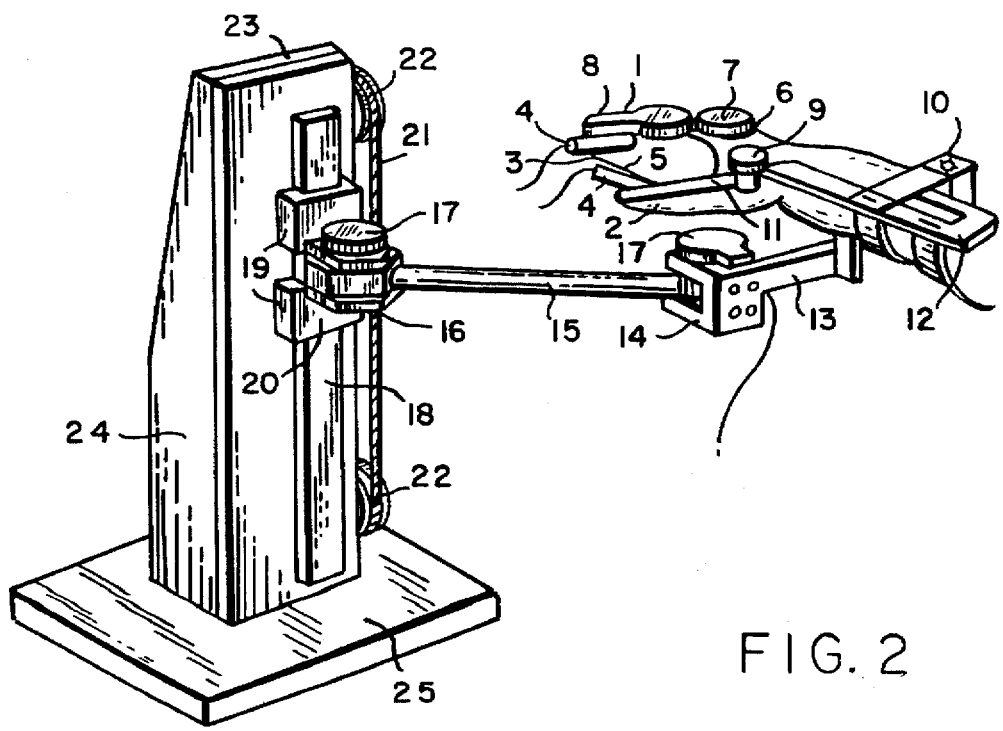
FIG. 2 is an overview of the preferred haptic display unit.
Figure 3:
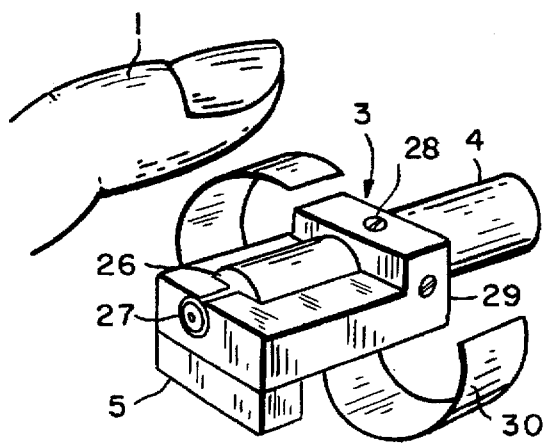
FIG. 3 is a detail of the slip display element.

In the preferred embodiment as shown in FIGS. 2 and 3, four sense and display elements were used; slip on the finger tips, force feedback to the index finger and thumb, variable frequency and amplitude vibrotactile displays to the fingertips (the EXOS TouchMaster) and vertical resistance. In addition the device provides position and orientation of each of the system elements. The reference numerals are defined as follows:

1. Index finger
2. Thumb
3. Tactile display (including slip and vibrotactile elements)
4. Slip display motor
5. Vibrotactile display
6. Modified two-degree-of-freedom SAFiRE providing force feedback to the index finger
7. Proximal linkage of the modified two-degree-of-freedom SAFiRE.
8. Distal linkage of the modified two-degree-of-freedom SAFiRE.
9. Cable conduits on the modified two-degree-of-freedom SAFiRE.
10. Motor package for the index finger and thumb force reflection mechanisms
11. Thumb force reflection device
12. Strap mounted bracket for haptic feedback device
13. Mounting bracket for haptic feedback device
14. Proximal passive pivot
15. Horizontally mounted linkage
16. Distal passive pivot
17. High resolution encoder
18. Front linear way
19. Front sliders
20. Front slider mounting plate
21. Second vertical cable
22. Set of idler pulleys
23. Motor actuating vertical degree-of-freedom through a cable system mounted on the rear slider
24. Vertical support structure
25. Heavy base
26. Textured delrin surface
27. Miniature bearing
28. Set screw
29. Mounting bracket for the slip and vibrotactile display elements
30. Finger strap
31. Activated trackball
32. Pinch rollers for driving the trackball
33. Flat surface on trackball
34. Two-degree-of-freedom roller
35. Endless belt
36. Six-degree-of-freedom roller
37. Surface features on the belt
38. Actuated thimble
39. Independently actuated thimble rings
40. Internal features inside thimble rings
41. Indexing cylinder
42. Surface features at different angular positions on the indexing cylinder
43. Slotted flat disk
44. Actuated, articulated linkage
45. Piezoelectric bimorph actuator element
46. Linear piezoelectric actuator element
47. Steel pins
48. Array of electromagnets In this embodiment a simple slip display 3 was developed. This slip display 3 consists of a delrin cylinder 26 with a textured surface, directly mounted on the shaft of a miniature gear motor 4. The cylinder 26 is supported on the other side with a miniature bearing 27. The motor is held by a set screw 28 in the mounting bracket.

The motor 4 was powered by a linear motor amplifier (not shown) and controlled by an MC-series Motion Controller board (Motion Engineering Inc., CA.)(not shown). The major specifications for the slip display and the associated experimental setup are: the slip display must be able to provide endless slip; it must be able to overcome the friction imposed by the normal contact force (up to 2 lb) between the fingertip and the force display; the maximum attainable speed of slip should be around 1 in/sec; the weight of the slip display should be less than 0.5 lb.

A voice coil vibrotactile display 5 which is comprised of a small magnet mounted in a shaped plastic housing. When excited by the control electronics it produces a variable frequency variable amplitude vibration to the housing. In the preferred embodiment this display 5 was attached to the mounting block of the slip display 3, and thus provides a vibratory stimulus to the fingertip.

The slip display 3 was attached to the tip of each of the index finger force feedback apparatus 6 and the thumb force feedback apparatus 11. Force reflection to the index finger 1 is provided by a modified two-degree-of-freedom SAFiRE (Sensing and Force reflecting Exoskeleton, patent application Ser. No. 07/961,259 submitted Oct. 15, 1992) prototype, which consists of two cable-driven linkages, with the two motors 10 mounted on the forearm. The axes of rotation of the linkages are co-located with the PIP and MCP joints of the index finger. Force reflection to the thumb is provided by a one-degree-of-freedom device, also driven by cables from a remotized motor mounted on the forearm.

The vertical resistance and position and orientation in space is provided by a boom. The vertical force reflection axis provided up to 2 lbs of virtual weight at the hand. It also supported the weight of the SAFiRE through counterbalancing. The stiffness of the vertical boom up to the SAFiRE attachment bracket exceeded 140 lb/in, the minimum stiffness required for a cantilevered beam to feel rigid to a human operator [Tan, 1993]. The resolution of the vertical and horizontal position sensors for the hand and index finger was 0.005 inch. Two linear ways were mounted on opposite sides of the vertical support structure, which was rigidly attached to a heavy base.

The drive mechanism for the vertical degree-of-freedom was located on the back of the support structure. The motor providing vertical force reflection was horizontally mounted on the slider riding in the rear linear way. A threaded capstan was directly mounted on the shaft of the motor 23. A 7×7, 0.032 inch diameter steel cable was wound 3–4 turns around the capstan. One end of the cable was terminated at the bottom of the vertical support structure. The other end was terminated on a cable tensioner at the top of the structure. As the motor rotated, the cable hoisted the slider up and down the rear linear way.

The rear slider was connected through a second cable and a set of pulleys to a plate mounted on two sliders riding in a second linear way 18, mounted on the front side of the vertical support structure. Using two sliders instead of one greatly improved the twisting and bending load capacity of the front linear way. The two sliders were mounted on the plate through two pivots to minimize bending moments applied to the front linear way.

Vertical forces were transmitted to the SAFiRE by a horizontally mounted linkage. The linkage consisted of a distal block attached to the front slider plate 20, proximal block, and a 12 inch long rod. The distal block housed the bearings and the encoder for the first passive pivot, also called the distal pivot. One end of the rod was pivoted about this block so that the linkage rotated freely in the horizontal plane. The other end of the rod was pivoted about a second bearing/encoder housing, also called the proximal pivot 14. The proximal mounting block was attached to the SAFiRE base with a rigid bracket. The length of this bracket was designed to position the hand so that the proximal pivot was between the tip of the index finger and the thumb.

The motor for vertical force reflection was selected based on the power requirements. We would like the motor to produce a force of 2 lbs at the hand. We also estimated that the hand could move at a maximum vertical speed of 8 in per sec. We selected 90 W motor without a gearhead to provide a smooth operation with minimal friction. The HEHD is designed to produce a force of 2 lb. at the fingertip. The tactile display must produce a force that exceeds the corresponding frictional force, if the frictional coefficient between the finger and the display is estimated at 0.5, the tactile display must be able to produce 1 lb. of force. If the display moved past the finger at 1 in/s, the required power would be around 0.112 W. A motor producing 0.25–0.5 W would therefore be a suitable actuator for this display. The MicroMo Series 1016 motor fits these requirements; it is 0.384 inch in diameter, 0.63 inch long and weighs 0.23 oz. This is mounted in the space beyond the fingertip.

This touch display hardware is interfaced to the world model, in this case implemented on a graphics rendering PC, through a local processor, in this case a VME card cage which houses a TIC30 DSP board, I/O boards, and a BiT3 VME-ISA bus adapter.

The preferred embodiment is not the only viable implementation of the multimode feedback. Any one element, such as the slip display, when combined with position or orientation sensing becomes a multimode display and thus must use the strategy for coordination, in a simplified form. Each sense and display unit has the ability to provide haptic cues to the operator as do the following alternate embodiments. The alternate embodiments can be roughly classified into trackball ideas, roller and belt ideas, indexing ring/ cylinder ideas, piezoelectrically actuated devices, magnetically actuated devices and other miscellaneous concepts.

Trackballs

Figure 4:
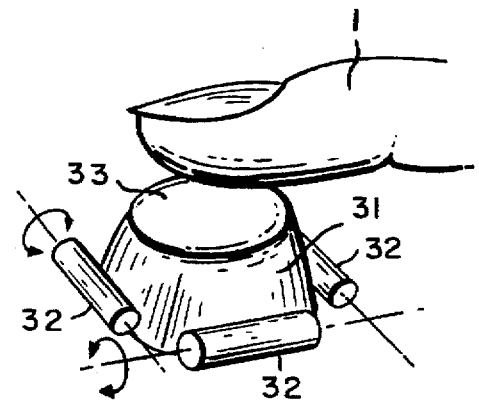
FIG. 4 is a concept sketch of an activated trackball based display.

The trackball (FIG. 4) concepts involve frictionally driven balls. The trackball can have two degrees-of-freedom and can produce lateral skin stretch as well as a sense of slip. However, it can not represent the nature of contact geometry.

A variation on this theme involves cutting a flat surface on the ball. This would produce a plane as well as an edge on the ball depending on how it is oriented with respect to the fingertip.

Roller and Belts

Figure 5:
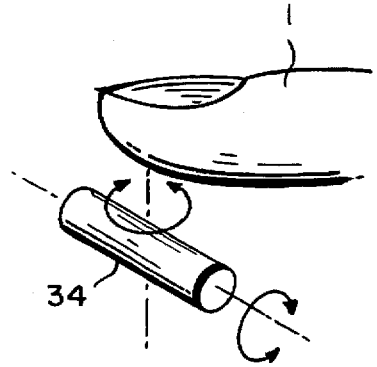
FIG. 5 is a concept sketch of a two-degree-of-freedom roller display.

A single roller can represent endless slip in two directions. If the roller is rotated about the center of the fingertip, slip in any direction may be simulated. If it is pressed hard against the fingertip, lateral skin stretch may be induced (see FIG. 5). A row of such rollers can represent slip as well as a rough simulation of a flat surface (as long as the rollers are small and closely spaced).

Figure 6:
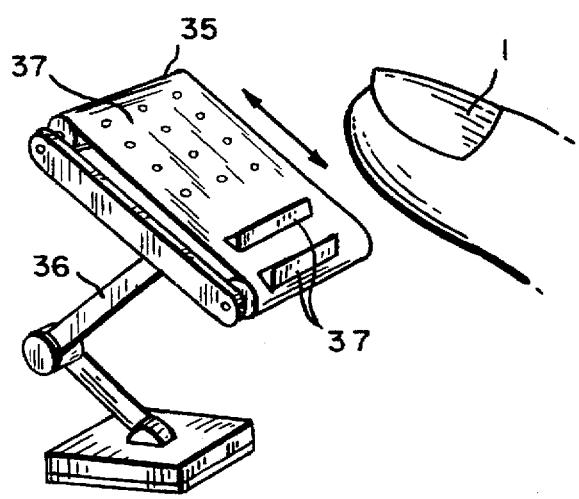
FIG. 6 is a concept sketch of an endless belt with various surface features mounted on a six degree-of-freedom mini-manipulator display.

An endless belt 35 (FIG. 6) may provide a better representation of a flat surface. If the endless belt can be rotated on its side, the edge of the belt can represent an edge. If the endless belt is mounted on a 6 degree-of-freedom miniature manipulator 36, it can represent slip and lateral skin stretch in any direction. Surface features may be built into the belt so that different textures are represented by different sections of the belt.

Indexing Ring/Cylinder

Figure 7:
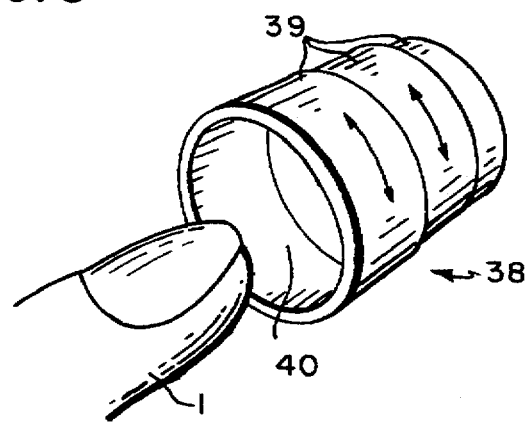
FIG. 7 is a concept sketch of a display consisting of several actuated thimble rings with internal features.

A thimble 38 (FIG. 7) made of several rings 39 with internal ridges may be built. By lining up the ridges on different rings, edges with different orientations may be created under the fingertip. Rotating each ring will also present a sense of slip in a direction normal to the longitudinal axis of the finger.

Figure 8:
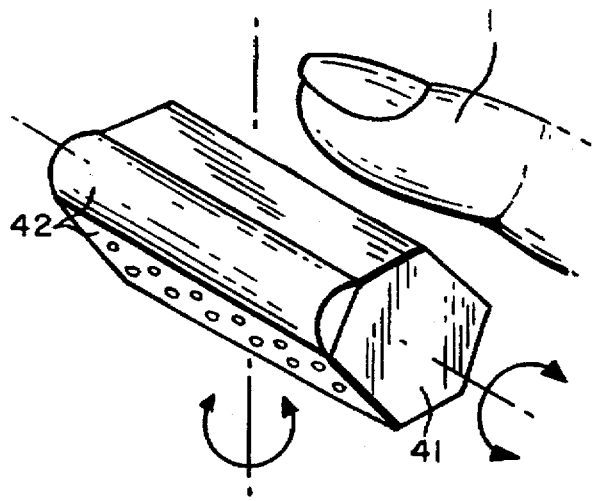
FIG. 8 is a concept sketch of a rotating solid cylinder with different surface features at different angular positions.

Alternatively, a solid cylinder 41 (FIG. 8) with different surface features at different angular positions may be built. By rotating the cylinder, different textures may be presented to the fingertip.

Figure 9:
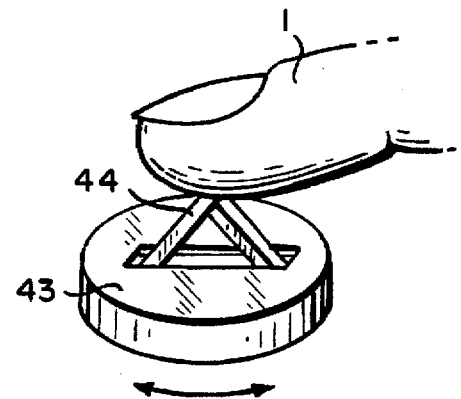
FIG. 9 is a concept sketch of a display consisting of a rotating, flat slotted disk with an articulated linkage.

A third variant involves a flat disk 43 (FIG. 9) with a slot down the middle of the disk. A miniature articulated linkage 44 may be raised from the slot to create a corner. When the linkage is retracted, a flat circular surface will be presented. Spinning the disk will create a sense of slip. Adding a rotational degree of freedom will allow the disk to be tilted with respect to the fingertip.

Piezoelectrically Activated Devices

Figure 10:
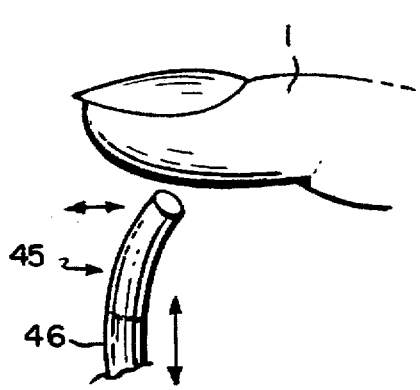
FIG. 10 is a concept sketch of a display with a piezoelectric bimorph actuator element mounted on top of a linear piezoelectric actuator element.

A piezoelectrically micromotor may be used to generate rotation in a small package. Alternatively, a deflecting piezoelectric actuator 45 may be mounted on top of a linear piezoelectric actuator 46 to produce a tiny manipulator that can push on the fingertip as well as drag it sideways for normal and lateral force representation (see FIG. 10).

Magnerically Activated Devices

Figure 11:
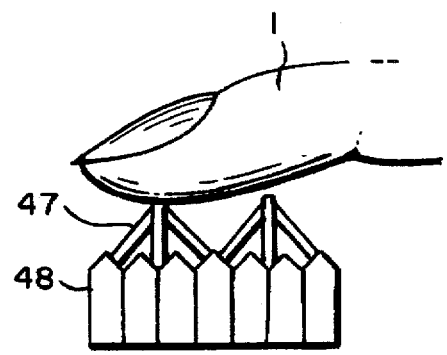
FIG. 11 is a concept sketch of a display in which steel pins are deflected by a varying magnetic field set up by an electromagnet array.
Figure 12:
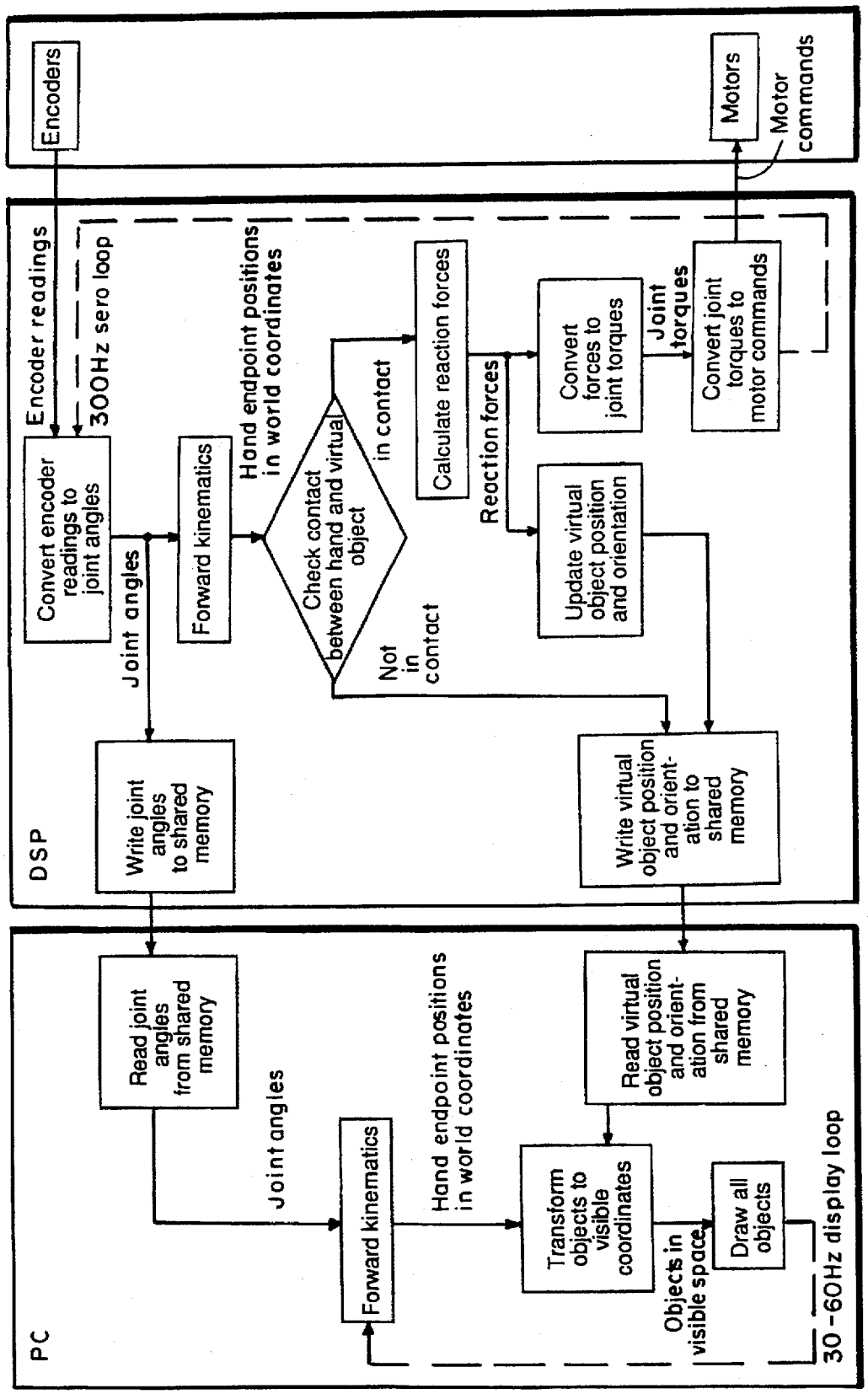
FIG. 12 is a block diagram and flow chart of the local processor as it interacts with the world modeling computer.

Using a complex magnetic field, ferrite dust may be made to form different shapes. Alternatively, by modulating the polarity and strength of an array of electromagnets 48, tiny steel pins 47 may be deflected to generate different shapes at the fingertip (see FIG. 11).

Others

Other ideas include using a thermoelectric cooling chip mounted against the finger to act as a heat sink. Since most metals are cold to the touch, this artificially induced heat loss may generate an illusion of being in contact with metal.

Certain changes may be made in the above apparatus without departing from the scope of the invention involved herein. It is intended that all matter contained in the above description or shown in the accompanying drawings shall be interpreted in an illustrative and not in a limiting sense.

What is claimed is:

1. An apparatus for creating a complex tactile sensation that is sensed by a hand of a human operator, the apparatus comprising:

(a) an articulating device dimensioned and constructed for receiving the hand of said operator, said articulating device including means for detecting a position and an orientation of said hand, and means for encoding the position and the orientation as data;

(b) means associated with the articulating device for sensing a force produced by the hand and producing a force signal in response thereto that is indicative of the force;

(c) computation means electrically coupled to the articulating device to receive said data and said force signal, said computation means calculating a set of commands based thereon; and (d) at least two display means for producing said complex tactile sensation, said display means receiving said set of commands from the computation means and producing said complex tactile sensation for the hand in response thereto.

2. The apparatus of claim 1 wherein the computation means is further adapted to contain a sensory model, said computation means further adapted to calculate said set of commands based on said data points and said sensory model.

3. The apparatus of claim 1 wherein said at least two display means comprises at least one slip display.

4. The apparatus of claim 1 wherein said at least two display means comprises at least one texture display.

5. The apparatus of claim 1 wherein said at least two display means comprises at least one force display.

6. The apparatus of claim 1 wherein said at least two display means comprises at least one temperature display.

7. The apparatus of claim 1 wherein said at least two display means comprises at least one vibration display.

8. The apparatus of claim 1 wherein said at least two display means comprises at least one shape display.

9. The apparatus of claim 1 wherein said at least two display means comprises at least one motion display.

10. A method for creating a complex tactile sensation that is sensed by a hand of a user, comprising the steps of:

(a) detecting a position and a movement of the hand and producing a data signal indicative of the position and the orientation of the hand;

(b) sensing a force produced by the hand and producing a force signal indicative of said force;

(c) producing a set of commands as a function of the data signal and the force signal; and (d) applying the complex tactile sensation to the hand, said sensation being created by a plurality of display means that are controlled by the set of commands.

* * * * *